US005320138A

United States Patent [19]

Ferlitch, Jr.

[11] Patent Number: 5,320,138

[45] Date of Patent: Jun. 14, 1994

[54] FIRE SPRINKLER TESTING SYSTEM AND CONTROL PANEL

[76] Inventor: Carl J. Ferlitch, Jr., 584-F Renee Dr., Joppatowne, Md. 21085

[21] Appl. No.: 25,670

[22] Filed: Mar. 3, 1993

[51] Int. Cl.[5] ....................... F16K 37/00; G01M 19/00

[52] U.S. Cl. ................................ 137/552.7; 137/559; 73/168; 73/DIG. 8; 169/23; 169/61; 239/71; 239/DIG. 15

[58] Field of Search ............... 137/552.7, 559; 73/168, 73/DIG. 8; 239/71, 72, 209, DIG. 15; 169/16, 17, 23, 61

[56] References Cited

U.S. PATENT DOCUMENTS

| | | | |
|---|---|---|---|
| 2,146,878 | 2/1939 | Arbogast | 137/552.7 X |
| 2,569,432 | 9/1951 | Halford | 137/552.7 X |
| 2,875,428 | 2/1959 | Griswold | 137/552.7 X |
| 2,933,139 | 4/1960 | O'Rear | 169/23 X |
| 3,825,766 | 7/1974 | Connor et al. | 169/61 X |
| 4,611,290 | 9/1986 | Henningsen et al. | 239/DIG. 15 X |
| 4,729,403 | 3/1988 | Roche | 137/559 |
| 4,854,165 | 8/1989 | Jay | 73/168 X |

*Primary Examiner*—John Rivell

*Attorney, Agent, or Firm*—Walter G. Finch

[57] ABSTRACT

The invention herein described relates to devices used to test the integrity of fire sprinkler systems. The present device incorporates a control panel which allows a single operator to electrically activate a test valve within a specific sprinkler network. The interval between the initiation of water flow and the resulting alarm signal is timed by the operator using the control panel. The operator can test any of the building's sprinkler networks simply by adjusting a rotary switch located on the control panel. In this manner, the time and expense associated with sprinkler testing may be greatly reduced by having a single operator perform dependable tests of the entire automatic sprinkler system from one location.

7 Claims, 3 Drawing Sheets

FIRE SPRINKLER TESTING SYSTEM AND CONTROL PANEL

FIELD OF THE INVENTION

This invention relates to improvements in apparatus used to test fire sprinkler systems, and more particularly, to an electrical apparatus which may be used to test numerous fire sprinkler networks from one location and which thereby reduces the time and manpower needed to conduct reliable tests.

BACKGROUND OF THE INVENTION

Since 1900, approximately 96% of the fires in sprinklered buildings have either been extinguished by sprinklers or held in check until manual fire fighting equipment arrived. The resulting savings in both life and property has been immeasurable. Yet, as business and industry continues to expand, so does the likelihood of catastrophic fire damage. The response to this overall increase in susceptibility of loss from fires has largely been to concentrate on developing newer and more effective sprinkler systems.

The sprinkler system, composed of a network of risers, cross mains, and branch lines all connected by a main line to the building's water supply, activates when one or more of the temperature sensitive sprinkler heads opens. Essentially, two situations may arise.

The first case occurs when there is in fact no fire, and the sprinkler system has been actuated either by a defect in or an external disturbance to the system. The resulting unnecessary water damage which may occur should be minimized through an immediate response by an experienced maintenance personnel.

The second case which involves a real fire is the greater concern. The event of an actual fire demands that the automatic sprinkler system perform its four basic functions: detect the fire, call attention to the fire condition, control the fire and keep it from growing, and extinguish the fire. In this situation, timely combat of the fire by experienced firemen may save both invaluable lives and costly property.

Therefore, in either case, one of the most critical functions of the alarm system is the prompt notification of concerned parties. This notification invariably begins as an electric signal which results from the activation of a water flow alarm device located in the riser or other pipe of the sprinkler system. The design of the water flow alarm usually includes a check valve or an alarm check valve and a pressure switch or a vane alarm which lifts a paddle upon the flow of water through the system, thereby mechanically activating an electric switch and thus initiating the electric signal.

If the fire sprinkler system was inadvertently set off, the warning signal allows the sprinkler system to be shut off before massive water deprivation occurs. If the sprinkler system has been activated by a fire, immediate warning of the fire and summon of fire extinguishing personnel results.

However, a malfunctioning water flow alarm device will prevent the successful notification of monitoring personnel. Moreover, problems such as an obstruction in the water line or an inadequate water supply may not only hinder emergency notification of monitoring individuals, but may also result in a less than optimal flow of water through the sprinkler heads themselves. The consequences of any defect in the sprinkler system could very well be disastrous.

Therefore, efforts have been made in the past to test the integrity of automatic sprinkler systems to assure that they will always successfully perform their functions. While one method to test the system would be to set off one of the sprinkler heads themselves, such a procedure would be complicated, time consuming, and more than likely, saturating.

The most popular method to test automatic sprinkler systems simulates an actual water discharge through a sprinkler head by initiating a water flow through the system at an alternate test location. In order to simulate a real water discharge as closely as is possible, this water flow is not greater than what would be the actual water flow through an open sprinkler head. In this manner, the water flow signal alarm can be activated to produce an electric signal while not disturbing any of the temperature sensitive elements in the sprinkler heads.

BEST KNOWN PRIOR ART

The best known prior U.S. art is as follows:

U.S. Pat. No. 4,643,224
U.S. Pat. No. 4,655,078
U.S. Pat. No. 4,729,403

The art of sprinkler system testing includes numerous test circuits which act to prove the water flow switch and the alarm. In the past, these test circuits included a series of fittings and interconnected pipes which provided a sequence of a test valve connected to the main line, a sight glass, a metering device, and a drain valve. The Rung et al. U.S. Pat. No. 4,643,224 teaches a test device which incorporates all of the known functions of such a test circuit into a single integrated unit. The Rung device simplifies installation of sprinkler system testing apparatus by having only two connections: one from the feed main to the valve body and one from the valve body to the drain line.

Both the U.S. Pat. No. 4,655,078 issued to Johnson and the U.S. Pat. No. 4,729,403 issued to Roche describe devices similar to the Rung invention. Both the Johnson and the Roche patents provide a single device through which water may flow either at a rate equal to the flow rate through the orifice of a sprinkler or at an essentially unrestricted flow rate.

While these inventions have greatly reduced the amount of space, the level of complexity, and the difficulty in installation associated with testing devices for automatic sprinkler systems, they do not reduce the time or manpower required to conduct the actual testing of the systems. Each of the aforementioned devices needs to be individually opened and closed by hand. Therefore, the art lacks a system which, while being centrally connected to all sprinkler test valves and water flow alarm switches within a building's fire sprinkler system, would enable a single operator to test all of the building's sprinkler systems from one place.

OBJECTS OF THE INVENTION

It is, therefore, the primary object of this invention to provide an electrical system which may be connected to all water flow alarm switches and test valves in a building's fire sprinkler system.

It is a further object of this invention to provide a novel electrical testing system which would allow a single operator to test each segment of a building's fire sprinkler system from a single testing area.

It is still another object of this invention to provide a control panel for operating the electrical testing system.

It is yet another object of this invention is to provide a novel control panel and electrical testing system which is independent of the sprinkler network's alarm system.

To provide a unique electrical testing system and control panel which allows the operator to time the interval between water flow initiation in a sprinkler network and the resulting alarm signal, is another object of this invention.

To provide a novel testing system and control panel for checking the integrity of sprinkler systems which may be used on conventional systems as well as on dry pipe arrangements, is still another object of this invention.

And to provide an electrical testing system for testing automatic sprinkler networks which, through selective operation of a control panel, may allow the water to flow for a specified time or could be manually turned on and off once the alarm is initiated is yet another object of this invention.

BRIEF DESCRIPTION OF THE DRAWINGS

These and other attendant advantages of this invention will become more obvious and apparent from the following detailed specification and accompanying drawings in which.

DESCRIPTION OF THE PREFERRED EMBODIMENTS OF THE INVENTION

Figure 1:
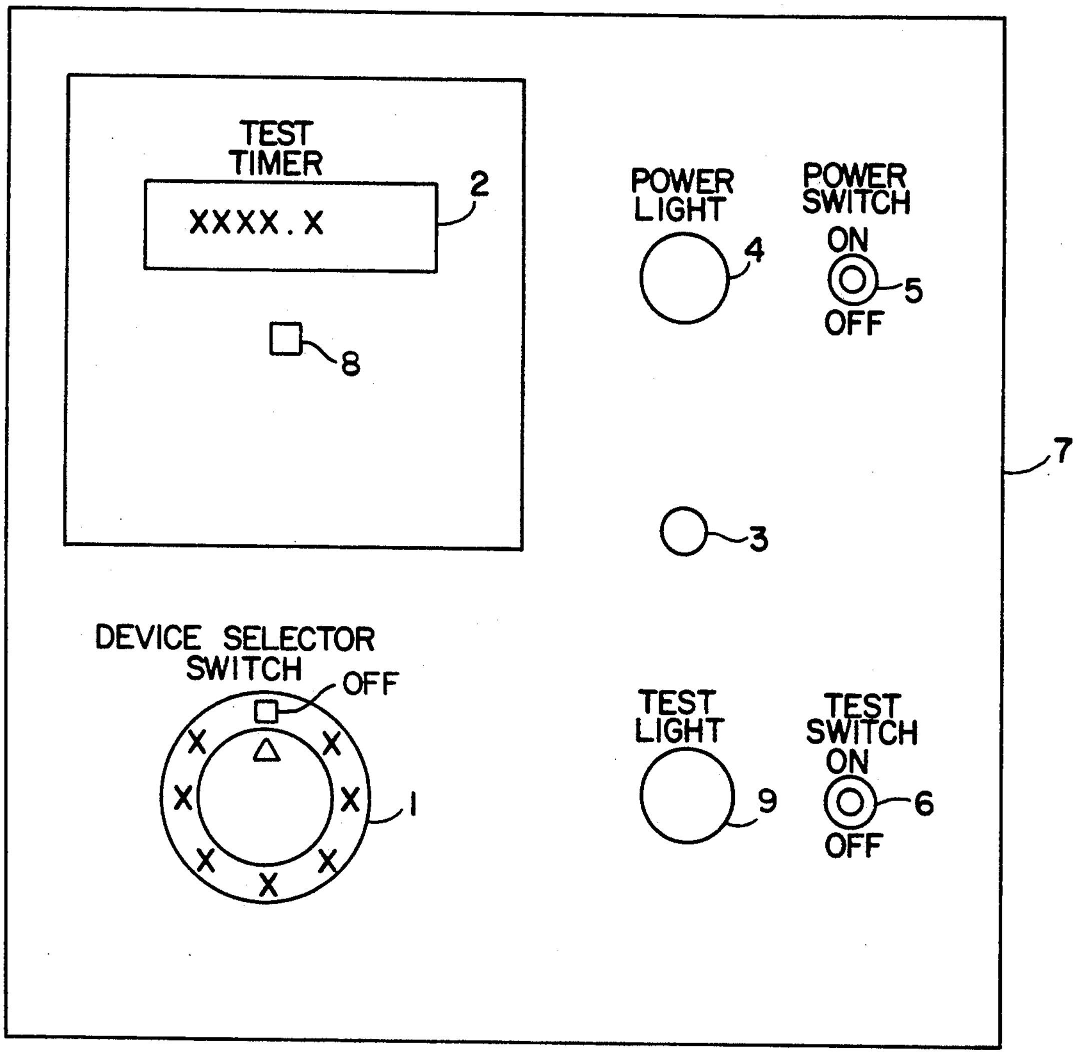
FIG. 1 is a drawing of a control panel for an electrical system used to test automatic sprinkler systems and incorporating novel features of this invention.
Figure 2:
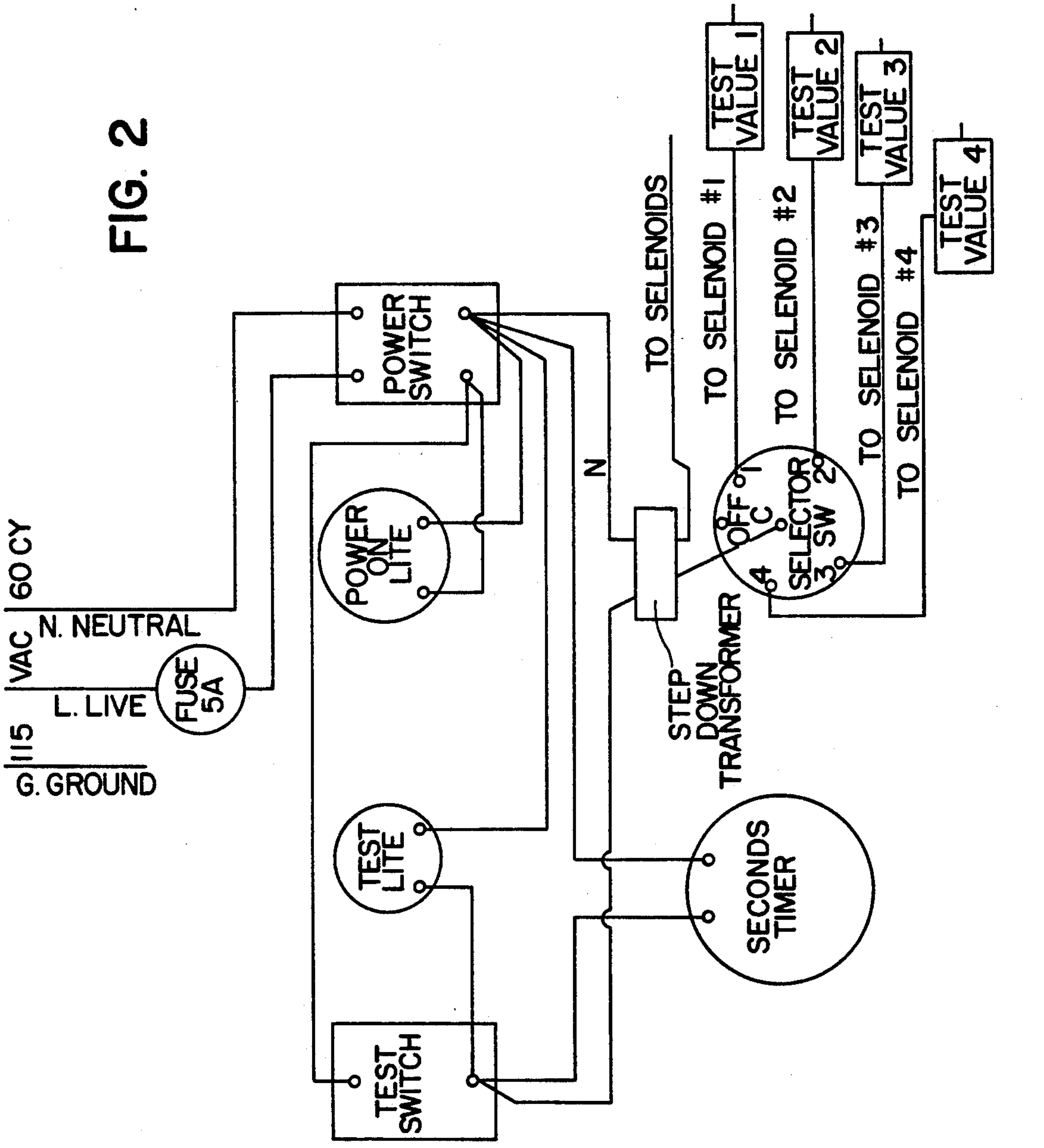
FIG. 2 is a wiring diagram of the electrical testing system controlled by the panel of FIG. 1.
Figure 3:
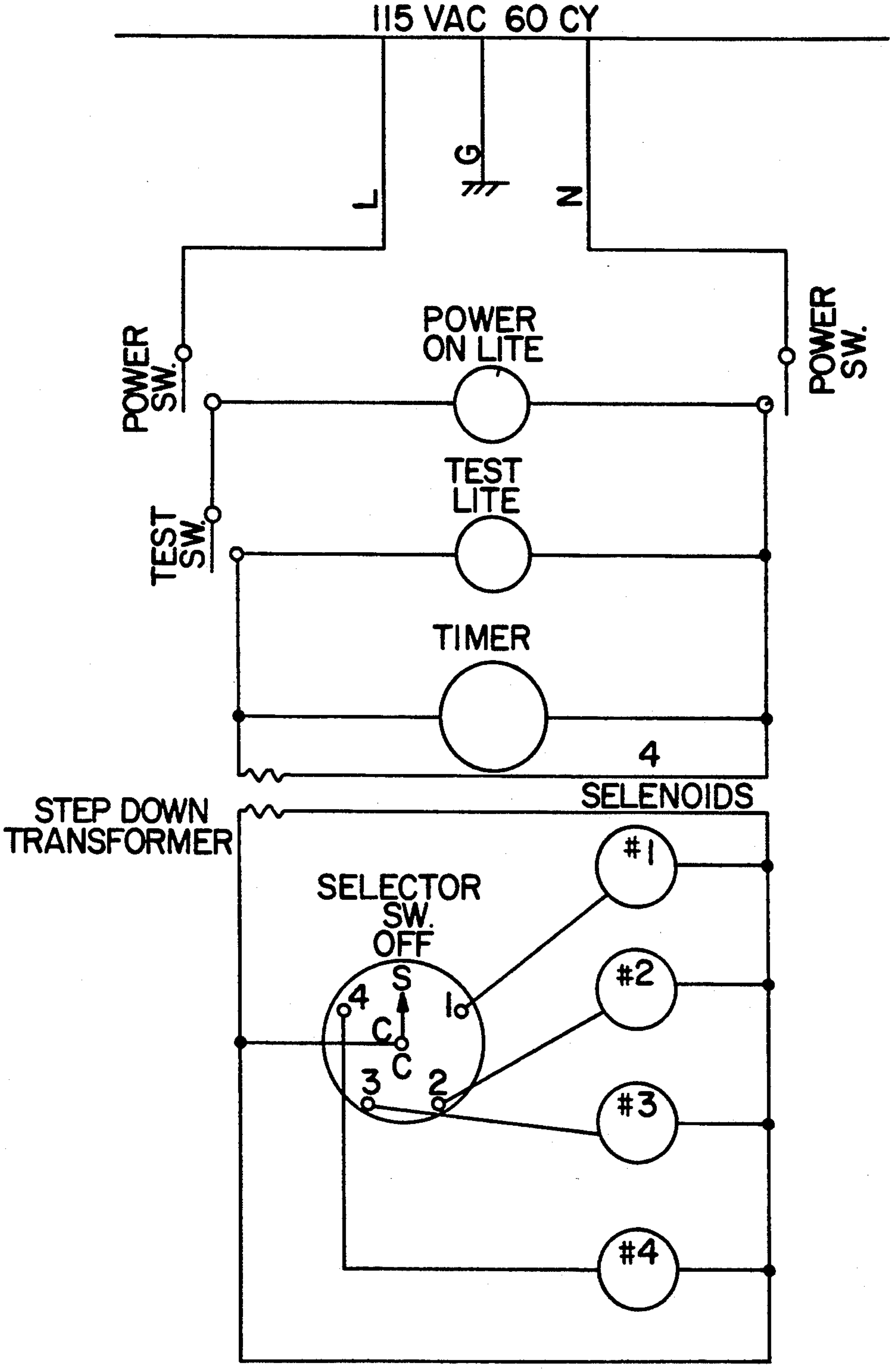
FIG. 3 is a schematic drawing of the electrical testing system controlled by the panel of FIG. 1.

Referring now to FIGS. 1 to 3 of the drawings, there is shown the preferred embodiment of a fire sprinkler testing system and test control panel 7. The test control panel 7 for the device is shown in FIG. 1. FIGS. 2 and 3 illustrate the electrical circuit of the system.

The primary components of the test control panel 7 of FIG. 1 are the timer 2, the power switch 5, the fuse 3, the test switch 6, and the selector switch 1. Turning the power switch 5 on activates the power light 4. The selector switch 1 allows the operator to select which sprinkler network will be tested. In FIG. 1, there are seven active positions and one off position about the selector switch 1, corresponding to seven individual sprinkler networks.

However, the number of active positions on the selector switch 1 depends on how many independent sprinkler networks there are. For instance, if a building had thirteen independent sprinkler networks each having its own water flow alarm switch, then the selector switch 1 would have thirteen active positions about its circumference, as well as one off position. Turning the test switch 6 on simultaneously activates the test light 9, starts the timer 2, and commences a water flow and alarm signal response test on the sprinkler system chosen on selector switch 1. When the alarm signal from the selected sprinkler system reaches an alarm control panel, a signal indicator light or audible signal comes on. Turning the test switch 6 off on the test control panel 7 simultaneously turns the test light 9 off, stops the counter 2, and ends the water flow and alarm signal response test on the sprinkler system chosen on selector switch 1. The reset button 8 initializes the timer 2.

FIGS. 2 and 3 illustrate the entire circuit for the electrical testing system. Both FIGS. 2 and 3 have four active positions around their respective selector switches 1, each active position coinciding to one of four different sprinkler systems (simplified as selenoids one through four on the drawings). Each selenoid corresponds to an independent sprinkler network having its own water flow alarm switch. In another arrangement, there may be thirty five different sprinkler networks, and therefore, thirty five active positions about the selector switch 1. By having all sprinkler networks tied to the same testing system, each sprinkler network may be individually tested from one location.

When the test switch 6 is turned on, a water flow and alarm signal test begins for the sprinkler network dialed on the selector switch 1. The test which is accomplished simulates what was previously done manually. That is, turning the test switch 6 on sends an electrical signal to open a test valve on the sprinkler network being tested. As illustrated in FIG. 2, each of the sprinkler networks (simplified as selenoids one through four) has its own test valve. The particular test valve which is opened during a signal test depends on which sprinkler network is dialed on the selector switch 1.

When the test valve is open, a flow of water not greater than that allowed by the smallest sprinkler head in that network initiates through the test valve. This flow of water should then mechanically activate the water flow alarm switch on the sprinkler network being tested.

Once the water flow alarm switch is activated, an electrical signal is transmitted to the alarm control panel of the alarm system and is indicated by a signal light or audible signal. The operator, seeing or hearing the signal on the alarm control panel, may then turn the test switch 6 (on the test control panel 7) off, which would in turn send one final signal to the sprinkler network being tested to shut the test valve and thus stop the water flow.

This type of test could be done for conventional sprinkler networks as well as for dry pipe arrangements. In the latter case, water will not flow through the entire system; rather, it will flow only to the dry pipe valve water flow switch. This will provide for reliable testing of dry pipe arrangements without tripping the differential dry pipe valve found in these systems.

A typical operation of the invention will now be described. The first step is to place the power switch 5 to the "on" position. The power light 4 will come on. Next, set the selector switch 1 to the sprinkler network being tested. If the timer 2 is not set at zero, initialize it by pressing the reset button 8. Place the test switch 6 to the "on" position. This will simultaneously start the timer 2, turn on the test light 9, an allow water to either flow through the wet pipe sprinkler system or to the dry pipe valve water flow switch (depending on the type of sprinkler arrangement being tested). In either case, a water flow alarm signal should be transmitted to the alarm control panel and indicated by a signal light or audible signal.

Once the signal registers on the alarm control panel, the operator can turn the test switch 6 (on the test control panel 7) to the "off" position. This will simultaneously stop the timer 2, turn off the test light 9, and stop the flow of water in the sprinkler network being tested. If the operator desires, he or she can allow the water to flow for a period of time after the alarm signal registers on the alarm control panel by waiting to turn the test switch 6 off. These steps may be repeated until all sprinkler networks in the building or facility have been tested.

If no alarm signal is transmitted to the alarm control panel during a test, then the sprinkler network being tested has malfunctioned. Prompt repair of the problem will be necessary. Also, if the alarm signal doesn't register on the alarm control panel for an extended period of time, the sprinkler network being tested will need to be serviced.

By using an electrical system and control panel such as that described, one operator who is not necessarily trained in testing sprinkler systems may make quick and reliable tests on a facility's automatic sprinkler networks. In a business where manpower is short and contractor's fees are high, this invention would be extremely valuable.

As described in this specification, the electrical testing system and corresponding test control panel 7 are completely independent of the sprinkler alarm system. In this arrangement, the electrical testing system (an independent unit) can not interfere with the operation of the sprinkler alarm system. Yet, in another embodiment, the electrical testing system could readily be integrated into the sprinkler alarm control panel.

It should be clear that the invention is not limited to the details illustrated in the accompanying drawings, but may be subject to modifications falling within the spirit and scope of the invention. Therefore, without restricting the invention to the specific construction previously described, the invention shall cover all modifications falling within the scope of the appended claims.

What is claimed is:

1. An electrical system for testing the integrity of automatic fire sprinkler networks which each have at least one test value, comprising, a test control panel, means to couple said test control panel to an electric power supply, means to select a particular sprinkler network to be tested, electrical means to open and close the test valve on said particular sprinkler network, and means to time the interval between the opening of said test valve on said particular sprinkler network and the receiving of an electrical signal from said particular sprinkler network being tested.

2. The electrical system for testing the integrity of automatic fire sprinkler networks as recited in claim 1, whereby the means for selecting said particular sprinkler network to be tested is a rotary switch located on said test control panel.

3. The electrical system for testing the integrity of automatic fire sprinkler networks as recited in claim 1, whereby the electrical means to open and close the test valve on said particular sprinkler network to be tested is a test switch located on said test control panel.

4. The electrical system for testing the integrity of automatic fire sprinkler networks as recited in claim 3, wherein the means to time the interval between the opening of the test valve on said particular sprinkler network and the receiving of the electrical signal from said particular sprinkler network being tested is a digital timer located on said test control panel, and whereby said digital timer is activated and deactivated by said test switch.

5. The electrical system for testing the integrity of automatic fire sprinkler networks as recited in claim 4, whereby said digital timer is initialized by a reset button located on said test control panel.

6. The electrical system for testing the integrity of automatic fire sprinkler networks as recited in claim 5, whereby said test control panel houses a power switch, a power light, a fuse, a test light, a rotary switch, said test switch, said digital timer, and said reset button.

7. The electrical system for testing the integrity of automatic fire sprinkler networks as recited in claim 1, whereby said electrical system and said test control panel are independent of any other alarm device used in conjunction with said fire sprinkler networks.

* * * * *